UNITED STATES PATENT OFFICE.

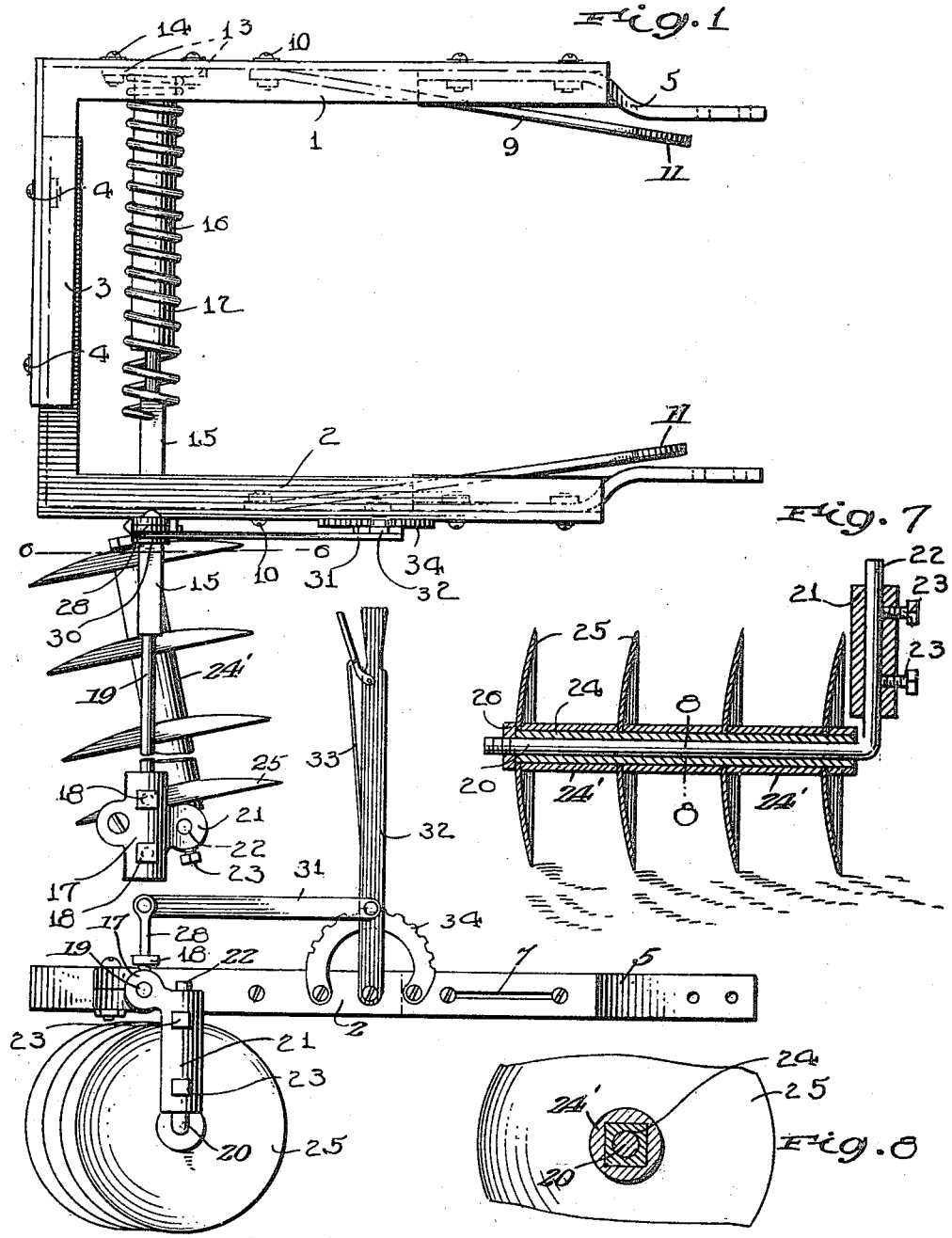

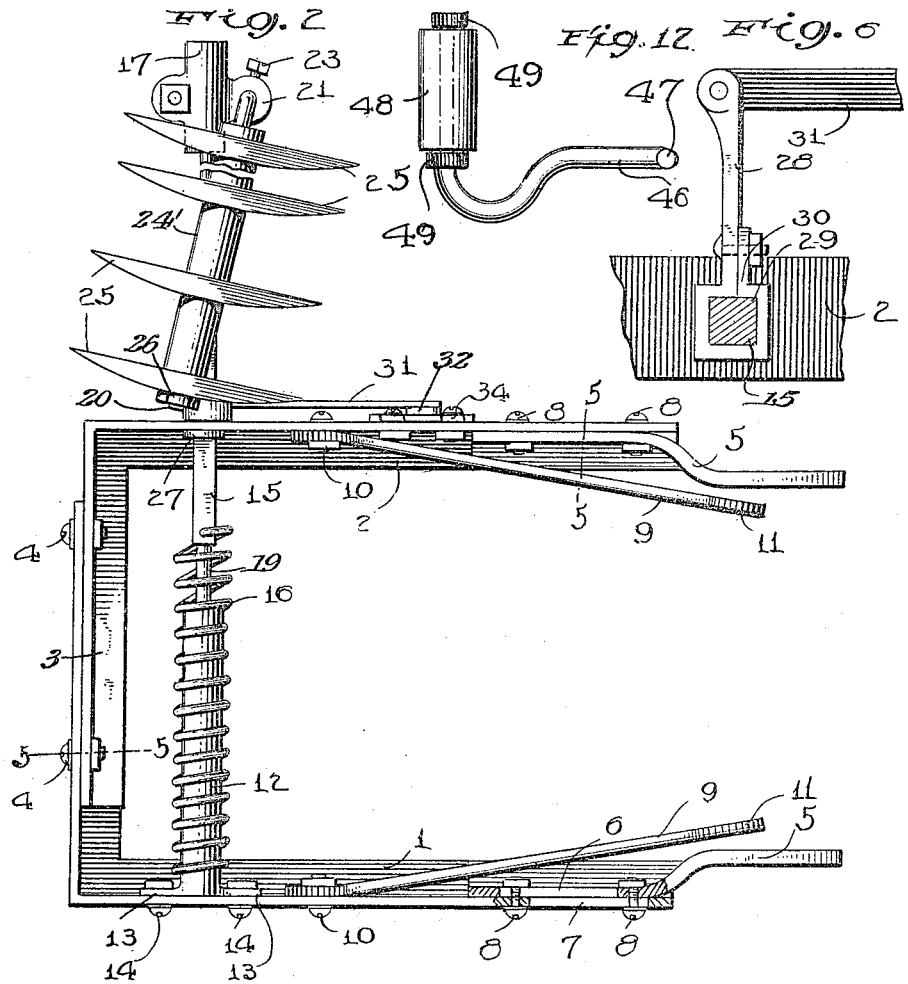
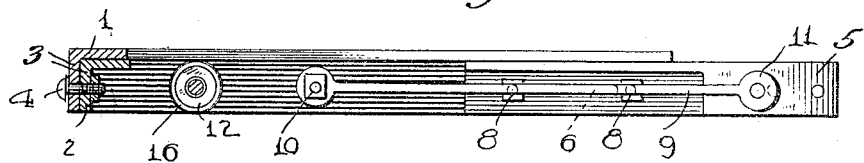
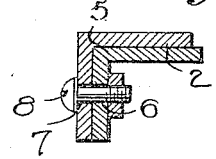

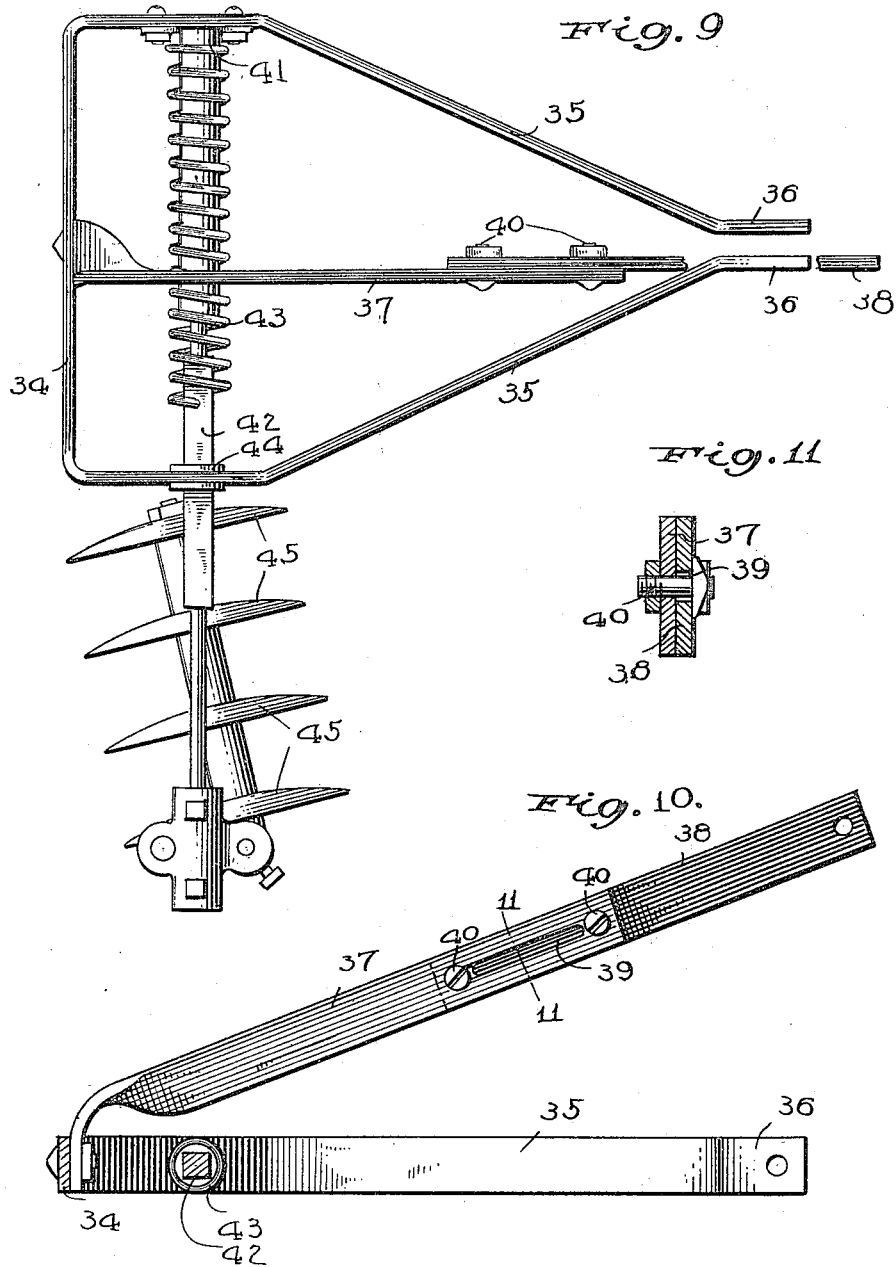

FRANK M. ORNER, OF CHASELEY, NORTH DAKOTA.

PLOW ATTACHMENT.

1,204,184.  Specification of Letters Patent.  Patented Nov. 7, 1916.

Application filed April 14, 1915. Serial No. 21,390.

*To all whom it may concern:*

Be it known that I, FRANK M. ORNER, a citizen of the United States of America, residing at Chaseley, in the county of Wells and State of North Dakota, have invented certain new and useful Improvements in Plow Attachments, of which the following is a specification, reference being had therein to the accompanying drawing.

This invention relates to harrow attachments for plows, and has for its object the production of an efficient harrow of the disk type, which may be readily attached to an ordinary sulky or plow frame or the ordinary plow beam, so as to allow the furrow to be harrowed directly after the same has been thrown by the mold board of the plow.

Another object of this invention is the production of an adjustable frame which may be regulated to accommodate different sized sulky plow frames.

With these and other objects in view, this invention consists of certain novel constructions, combinations and arrangements of parts, as will be hereinafter fully described and claimed.

In the drawings:—Figure 1 is a top plan view of the device. Fig. 2 is a bottom plan view of the device. Fig. 3 is a side elevation of the device. Fig. 4 is a central longitudinal section of the frame. Fig. 5 is a section taken on line 5—5 of Fig. 2. Fig. 6 is a section taken on line 6—6 of Fig. 1. Fig. 7 is a longitudinal section of the harrow supporting journal. Fig. 8 is a transverse section taken on line 8—8 of Fig. 7. Fig. 9 is a top plan view of a modified form of the invention. Fig. 10 is a side elevation of the form of invention illustrated in Fig. 9. Fig. 11 is a section taken on line 11—11 of Fig. 10. Fig. 12 is a top plan view of the roller attachment adapted to be secured to the socket member or the clamp which supports the harrow disks.

By referring to the drawings by numerals, it will be seen that the harrow supporting frame comprises a primary section 1, and an auxiliary section 2. Each of the sections 1 and 2 is provided with an overlapping portion 3, which overlapping portions are connected together by means of bolts 4. These sections 1 and 2 are formed of an angle structure in cross section, as illustrated in Fig. 5, and the side members of the sections carry connecting tongues 5 at their forward ends, which tongues are longitudinally slotted as indicated at 6, and the outer ends of the frames 1 and 2 are also slotted as indicated at 7, through which bolts 8 pass for adjustably securing the connecting tongues to the frame. Bracing guy members 9 are connected to the sides of the frames as indicated at 10, by means of bolts, and the forward ends of these members are provided with eyes 11 for engaging the frame of the sulky plow for firmly holding the harrow frame in engagement with the frame of the sulky plow.

A harrow supporting sleeve 12 is carried by the primary section 1, and is provided with a plurality of laterally extending feet 13, which feet are secured to the members 1, by means of bolts 14. The section 15 which is square in cross-section is formed integral upon the rod 19 so as to be permanently mounted thereon. The coiled spring carried by the sleeve 12 engages the section 15 for normally urging the rod 19 in one direction. The journal 17 is keyed upon the rod 19 by means of the set screws 18. The harrow supporting sleeve 12 is provided with a slidably mounted section 15 which is firmly held in engagement with the main portion of the sleeve 12 by means of the coil spring 16. A disk supporting shaft 20 is suspended from the journal 17, and this journal is provided with an enlarged portion 21 in which the vertically extending portion 22 of the shaft 20 is adjustably mounted by means of screws 23. A sleeve 24 is positioned upon the shaft 20, and is squared so as to allow the disks 25 to be keyed to the sleeve 24. The disks 25 which may be of any desired number are held upon the sleeve 24, by means of a nut 26. The disks 25 are held in spaced relation by the spacing sleeves 24' carried by the sleeve 24, as shown clearly in Fig. 7. It will, therefore, be seen that through the medium of the depending portion 21, the harrow disk 25 may be vertically adjusted relative to the body of the machine.

The section 15 passes through a cylindrical journal 27, which journal is journaled in one of the side flanges of the auxiliary section 2 for facilitating the rotation of the section 15 upon the frame. A vertically extending arm 28 is clamped upon the squared portion 29 of the section 15 of the harrow supporting member by having its lower end bolted around the squared portion 29 as indicated at 30. The upper end of this arm 28 engages a link 31, which link in turn engages an operating lever 32. This operating lever carries a ratchet engaging plunger 33 of the usual type for engaging the quadrant 34 whereby the disks may be held into or out of engagement with the ground over which the harrow is passing. It will be seen that as the lever is thrown forward, the disks 25 will be thrown into engagement with the ground whereas if the lever is thrown backward, the disks may be raised from the ground.

From the foregoing description, it will be seen that a very efficient and durable device has been produced which will facilitate the raising and lowering of the disks from off the ground, and furthermore, a device has been produced which may be adjusted so as to accommodate the different sized sulky plow frames.

As illustrated in Figs. 9, 10 and 11, I have illustrated a modified form of the invention, wherein the harrow frame comprises a body portion 34, having forwardly extending converging side members 35 terminating in parallel beam dripping fingers 36. These finger fit upon each side of the plow beam for connecting the frame 34 to the plow beam. An upwardly extending bracing member 37 is connected to the rear end of the frame 34, and is provided with an adjustable section 38, which connects to the beam plow or any desired portion of the plow for allowing the frame to be conveniently secured to the plow. It will be seen that this brace 37 is provided with a slot 39 in which work the screws 40 for facilitating the regulation of the brace. A harrow supporting sleeve 41, similar to that just described with reference to Figs. 1 and 2 is carried by the frame 34, and within this sleeve 41 is positioned an adjustably mounted section 42 which is connected thereto by means of a spring 43. A journal 44 is carried by the body 34 through which the squared portion of the adjustable section 42 passes and the usual disks 45 are supported in like manner as that just described with regard to Figs. 1 and 2.

A roller attachment, as illustrated in Fig. 12, is adapted to be secured to the socket member 17 when it is desired to roll the furrows after the same have been harrowed or thrown up by means of the disks 25. This roller attachment comprises a supporting rod 46, which rod is provided with an upwardly projecting end 47, which end is adapted to fit in the socket 21 of the socket member 17. A roller 48 is secured to the member 46 and collars 49 are formed upon the member 46 so as to hold the roller against longitudinal movement upon the member 46. It should be understood that this roller is adapted to be attached to the socket 17 after the disks 25 have been removed therefrom, and it will be further understood that the roller is intended for use when breaking prairie sod so as to press the sod firmly in their place, whereby the moisture will be retained within the ground for facilitating the growing of crops. It will be further understood that the furrows will be in their place and the ground will not be affected by rolling the same in the manner just described with the exception that the sod will be pressed tightly in the desired manner.

What is claimed is:—

1. A harrow of the class described, comprising a frame provided with a plurality of adjustable sections, a harrow supporting sleeve carried by said frame, a rod carried by said sleeve, spring means connecting said rod to said sleeve, harrow disks carried by said rod, and means carried by said frame for vertically adjusting said harrow disks.

2. A harrow of the class described, comprising a frame provided with a plurality of laterally adjustable sections, a harrow supporting sleeve carried by said frame, an adjustably mounted rod carried by said harrow supporting sleeve, spring means connecting said rod to said sleeve, a harrow disk supporting shaft carried by said rod, disks carried by said shaft, and means carried by said frame for raising and lowering said disks.

3. A harrow of the class described comprising a frame provided with a plurality of adjustable sections, a harrow supporting sleeve carried by said frame, a rotatable rod carried by said sleeve, yieldable means carried by said sleeve and engaging said rod for urging said rod in one direction, a depending harrow disk supporting shaft carried by said rod, disks carried by said shaft, and lever means associated with said rod for rotating the same, whereby said harrow disks may be raised and lowered.

4. A harrow of the class described comprising a frame, an adjustable rod carried by said frame, a depending harrow disk supporting shaft carried by said adjustable rod, disks carried by said shaft, an upwardly extending link carried by said adjustable rod, and lever means carried by said upwardly extending link for causing said harrow disks to be raised and lowered, relative to said frame as said lever is actuated.

5. In a harrow of the class described, the combination of a frame, a sleeve positioned upon said frame and being provided with a pair of laterally extending feet, means passing through said feet and engaging said frame for securing said sleeve to said frame, a rod rotatably carried by said sleeve, harrow disks carried by said rod, and means for swinging said harrow disks into and out of engagement with the ground.

6. In a harrow attachment of the class described, the combination of a frame, a sleeve fixedly secured to said frame, a rod rotatably carried by said sleeve, means for rotating said rod, a laterally adjustable shaft connected to said rod, disks carried by said shaft, said shaft being adapted to adjust said disks in a vertical plane and said means being adapted to swing said disks into and out of engagement with the ground.

7. In a harrow of the class described, the combination of a frame, a sleeve carried by said frame, a rod rotatably carried by said sleeve, means for rotating said rod in either direction and retaining the same in a set position, a journal carried upon the outer end of said rod, means for holding said journal upon said rod, an enlarged portion formed upon said journal, a shaft pivotally mounted upon said enlarged portion, disks carried by said shaft, said shaft being adapted to swing said disks in a horizontal plane and said first-mentioned means being adapted to swing said disks into and out of engagement with the ground.

8. In a harrow of the class described, the combination of a frame, a sleeve carried by said frame, a rod rotatably carried by said sleeve, means for rotating said rod in either direction and retaining the same in a set position, a journal carried upon the outer end of said rod, set screws carried by said journal and engaging said rod for holding said journal upon said rod, an enlarged portion formed upon said journal and having a vertical opening formed therein, a shaft having a vertically extending portion fitting within said opening, means for holding said shaft in an adjusted set position, disks rotatably mounted upon said shaft, said shaft being adapted to adjust said disks in a horizontal plane, and said first-mentioned means being adapted to swing said disks into and out of engagement with the ground.

9. In a harrow of the class described, the combination of a frame, a sleeve carried by said frame, a rod rotatably mounted upon said sleeve, a square section formed upon said rod, a rotatable journal carried by said frame having a square opening, said square section passing through said square opening, disks carried by the outer end of said rod, a vertically extending arm having a square clamp upon its lower end, said clamp engaging the square section of said rod, a link connected to the upper end of said arm, a lever pivotally and adjustably mounted upon said frame, said link engaging said lever, whereby when said lever is rocked said disks may be swung into or out of engagement with the ground.

In testimony whereof I hereunto affix my signature.

FRANK M. ORNER.

Copies of this patent may be obtained for five cents each, by addressing the "Commissioner of Patents, Washington, D. C."